United States Patent [19]

Moore et al.

[11] Patent Number: 5,219,439
[45] Date of Patent: Jun. 15, 1993

[54] VEHICLE UNDERBODY FLOOR PAN TO FRAME RAILS MOUNTING ARRANGEMENT

[75] Inventors: Thomas S. Moore, Northville; John C. Dziuba, Ann Arbor; John S. Haynes, Troy; Ralph A. Porcaro, Clinton Township, Macomb County, all of Mich.

[73] Assignee: Chrysler Corporation, Highland Park, Mich.

[21] Appl. No.: 935,602

[22] Filed: Aug. 26, 1992

[51] Int. Cl.⁵ .............................. B62D 24/02
[52] U.S. Cl. ................... 296/35.1; 296/203; 296/204
[58] Field of Search ........ 296/35.1, 35.2, 29, 296/203, 204; 280/788, 790

[56] References Cited

U.S. PATENT DOCUMENTS

| | | | |
|---|---|---|---|
| 1,872,671 | 8/1932 | Beck et al. | 296/35.1 X |
| 2,053,991 | 9/1936 | Goodwin | 296/35.1 X |
| 2,132,840 | 10/1938 | Workman et al. | 296/35.1 X |
| 2,144,170 | 1/1939 | Utz et al. | 296/35.1 |
| 2,171,947 | 9/1939 | Parker | 296/35.1 |
| 2,213,010 | 8/1940 | MacPherson | 296/35.1 X |
| 2,384,096 | 9/1945 | Kishline | 296/35.1 |
| 2,505,294 | 4/1950 | Meade | 296/35.1 |
| 2,838,339 | 6/1958 | Schaldenbrand | 296/35.1 |
| 2,883,232 | 4/1959 | Olley et al. | 296/35.1 X |
| 2,964,331 | 12/1960 | Sherman | 280/792 X |
| 3,003,811 | 10/1961 | Sherman | 296/35.1 |
| 3,010,757 | 11/1961 | De Haan | 296/35.1 |
| 3,149,856 | 9/1964 | Schilberg | 280/790 X |
| 3,177,031 | 4/1965 | Schilberg | 280/790 X |
| 3,298,762 | 1/1967 | Peck et al. | 384/125 |
| 3,851,913 | 12/1974 | Knoth | 296/35.1 |
| 4,093,253 | 6/1978 | Lehr | 280/789 |
| 4,702,346 | 10/1987 | Uno et al. | 181/207 |
| 5,129,700 | 7/1992 | Trevisan et al. | 296/901 X |

*Primary Examiner*—Dennis H. Pedder
*Attorney, Agent, or Firm*—Edward P. Barthel

[57] ABSTRACT

A frame and underbody floor pan mounting arrangement for a motor vehicle, including a frame having oppositely disposed side rails and a plurality of longitudinally spaced bushing assemblies mounted through openings in each of the side rails. An underbody floor cross pan has oppositely disposed inverted U-shaped ribs formed thereon adapted to being mounted over the side rails and secured to opposite ends of the plurality of bushing assemblies, providing a low pan height and an isolated mounting of the vehicle body to the frame.

6 Claims, 6 Drawing Sheets

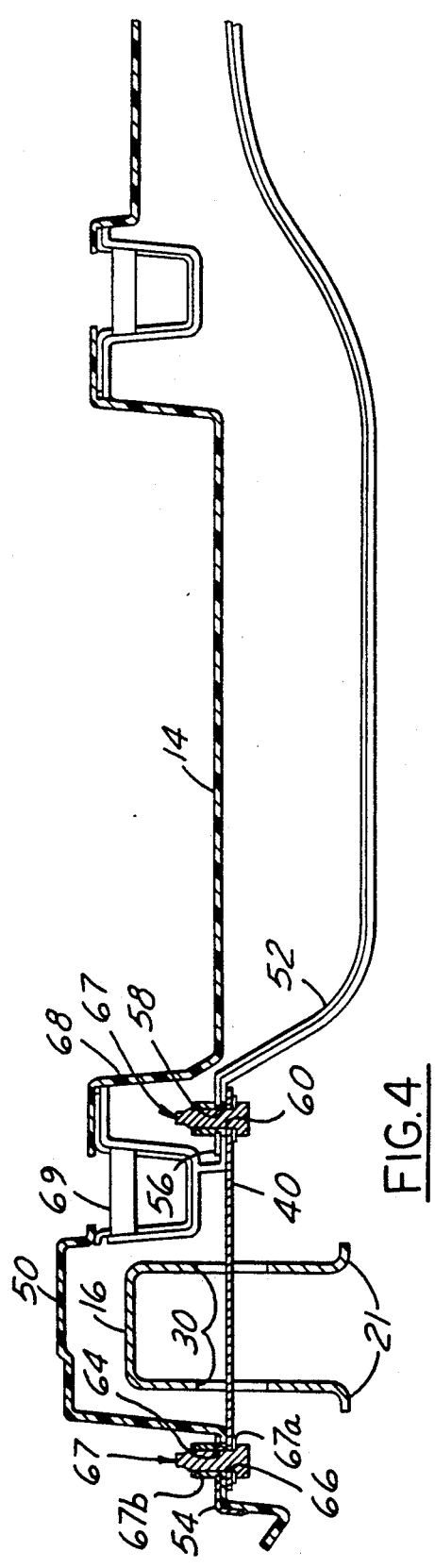
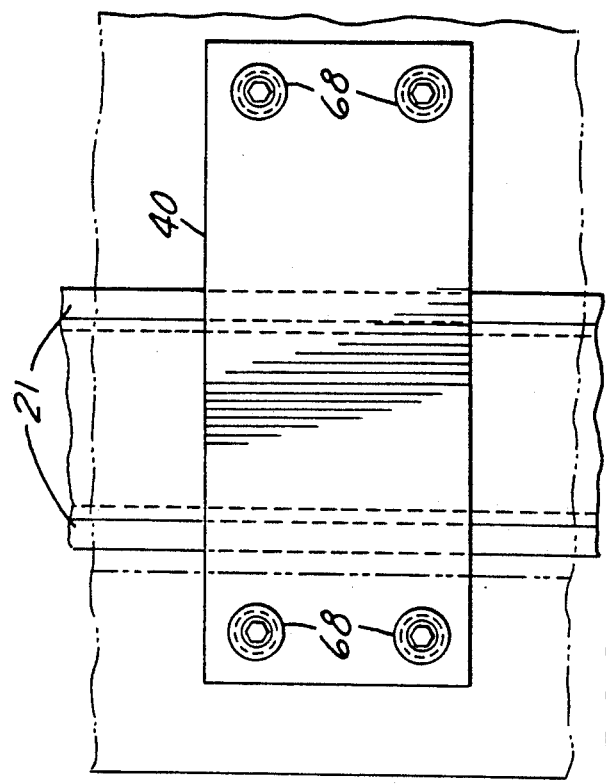
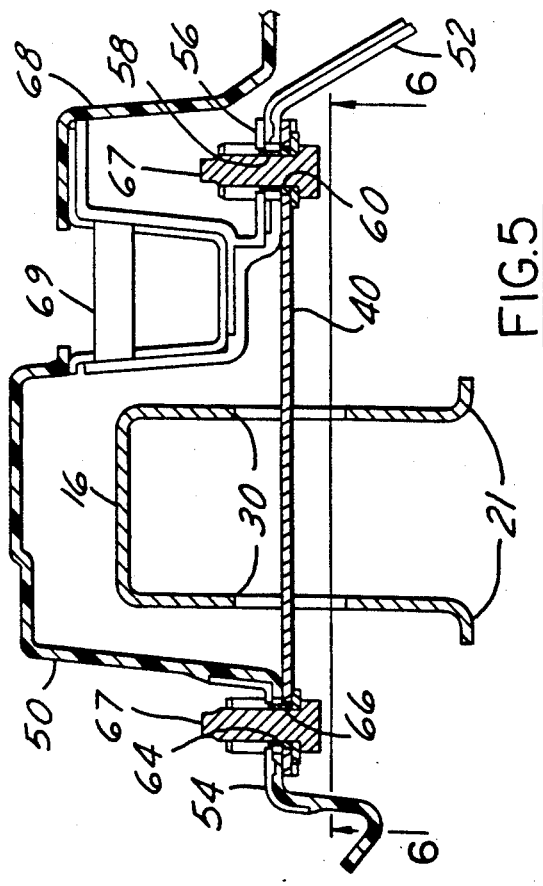

VEHICLE UNDERBODY FLOOR PAN TO FRAME RAILS MOUNTING ARRANGEMENT

TECHNICAL FIELD

This invention relates generally to vehicle chassis and, more particularly, to an operatively interconnected frame and underbody floor pan.

BACKGROUND ART

Heretofore, vehicle chassis have generally included a floor stacked on top of a frame, with vertically oriented elastomeric bushings therebetween. The following patents are examples of such arrangements: Utz et al U.S. Pat. No. 2,144,170; Parker U.S. Pat. No. 2,171,947; Kishline U.S. Pat. No. 2,384,096; Schaldenbrand U.S. Pat. No. 2,838,339; and Schilberg U.S. Pat. No. 3,177,031.

In Olley et al U.S. Pat. No. 2,883,232, both vertically oriented and inverted U-shaped resilient spaced apart pads are used, and the floor panel is supported above the side rail by shelf type brackets secured by tie bolts positioned just above the channel side rails.

Sherman U.S. Pat. Nos. 2,964,331 and 3,003,811 have as an object thereof the providing of a low silhouette. U.S. Pat. No. 3,003,811 discloses both conventional vertically extending mounting means and horizontally extending tubular body mounts, while U.S. Pat. No. 2,964,331 discloses a floor at the height of the bottom of the frame side bars, with inverted U-shaped body side sills adapted to mount over the side bars.

Uno et al U.S. Pat. No. 4,702,346 discloses vibration insulators including various arrangements of recessed elastomeric bodies interposed between outer and inner tubular members.

Peck et al U.S. Pat. No. 3,298,762 discloses a self-lubricating joint including end ferrules abutting the oppositely disposed ends of a resilient sleeve member having grooves formed therein, subjecting the sleeve member to an axial compression force to effect an end seal of the bushing structure.

DISCLOSURE OF THE INVENTION

A general object of the invention is to provide an improved mounting arrangement of vehicle underbody floor pan to frame side rails.

Another object of the invention is to provide a vehicle underbody to frame mounting arrangement, wherein the underbody floor cross sill and the frame side rails overlap one another in an isolated manner to provide a low vehicle silhouette.

A further object of the invention is to provide a vehicle underbody to frame mounting arrangement including oppositely disposed frame side rails having longitudinally spaced circular openings formed therethrough for the mounting therein of horizontally disposed elastomeric bushing assemblies adaptable to having the extended ends thereof connected to outboard and inboard walls of inverted U-shaped ribs formed on opposite sides of an underbody floor cross sill.

Still another object of the invention is to provide such an underbody floor cross sill formed of any suitable material, such as a structural plastic or a composite, and having at least one steel cross brace secured thereto to be supported on the inner ends of mounting plates extending through transversely aligned rectangular openings formed through the side rails, with the outboard wall of an inverted U-shaped rib formed on the oppositely disposed side of the underbody floor cross sill secured to the outer ends of the mounting plates, such that the latter plates are free to move within the rectangular openings.

A still further object of the invention is to provide elastomeric bushing assemblies which may be varied in durometer and size and variably voided therearound for desirable tuning of the vertical, longitudinal, and lateral rate of each mount at the various positions of the bushing assemblies along the frame rails.

These and other objects and advantages will become more apparent when reference is made to the following drawings and the accompanying description.

BRIEF DESCRIPTION OF THE DRAWINGS

FIG. 4 is a cross sectional view taken along the plane of the line 4—4 of FIG. 2, as if FIG. 2 were a frame rail and a complete underbody floor cross pan, and looking in the direction of the arrows;

FIG. 5 is an enlarged view of a portion of FIG. 4;

FIG. 6 is a view taken along the plane of the line 6—6 of FIG. 5, and looking in the direction of the arrows;

BEST MODE OF CARRYING OUT THE INVENTION

Figure 1:
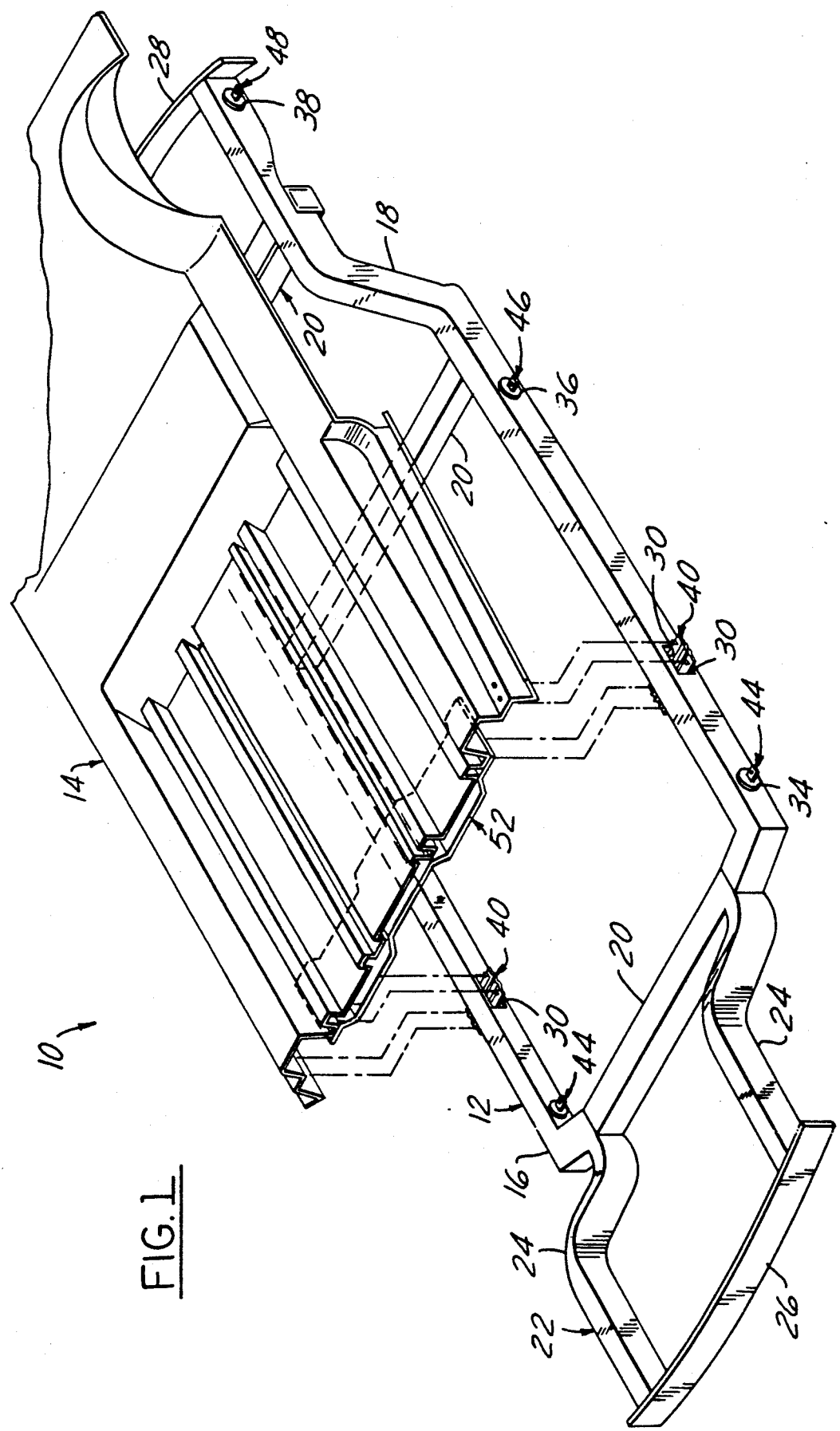
FIG. 1 is a perspective view of a vehicle underbody floor pan and frame embodying the inventive mounting arrangement therefore.
Figure 2:
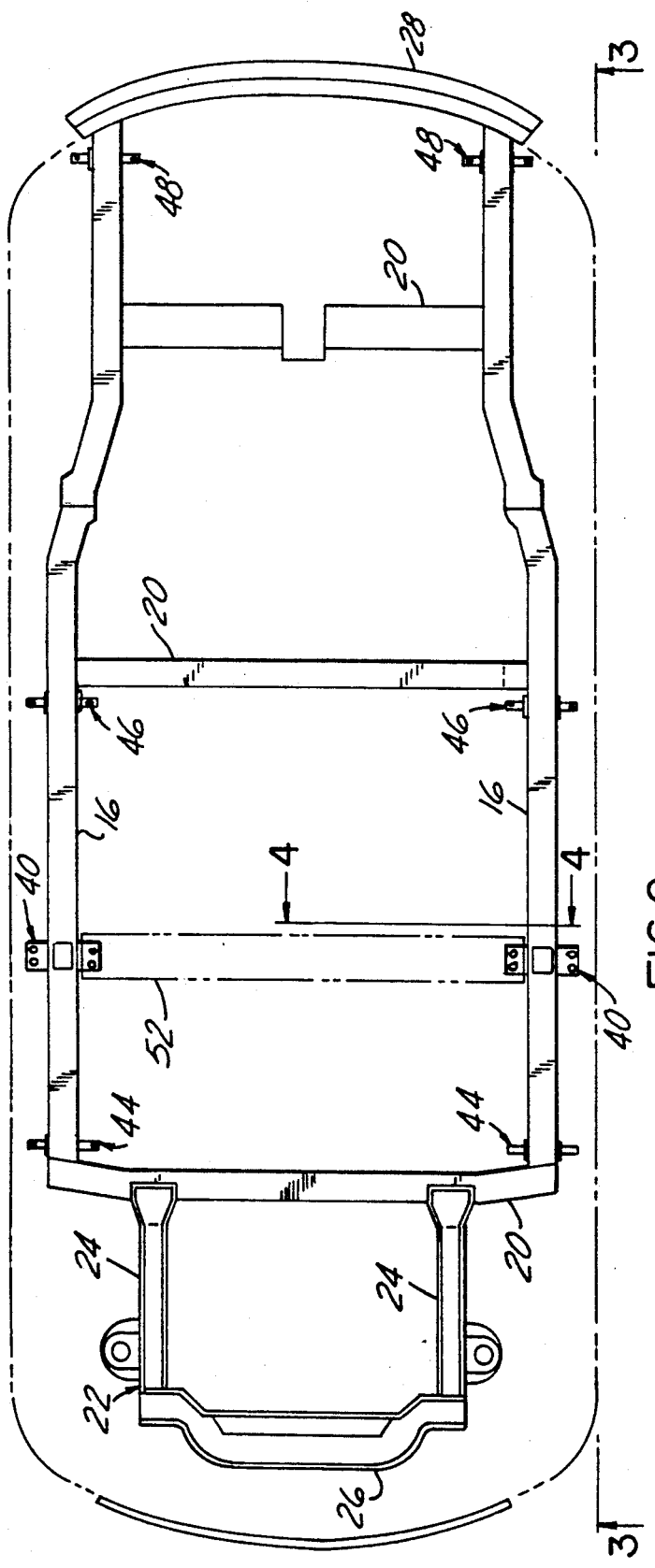
FIG. 2 is a plan view of the frame and portions of the underbody floor cross sill.
Figure 3:
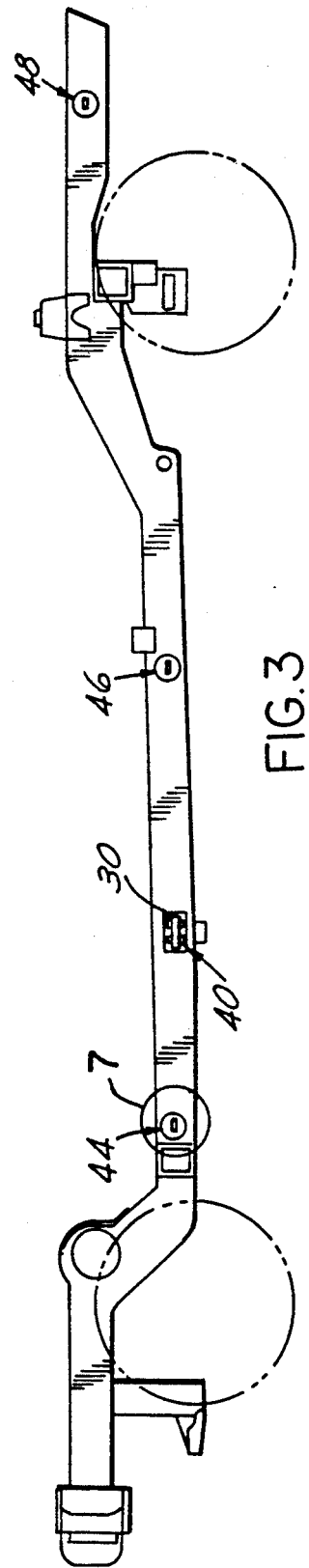
FIG. 3 is a side view taken along the plane of the line 3—3 of FIG. 2, and looking in the direction of the arrows.
Figure 7:
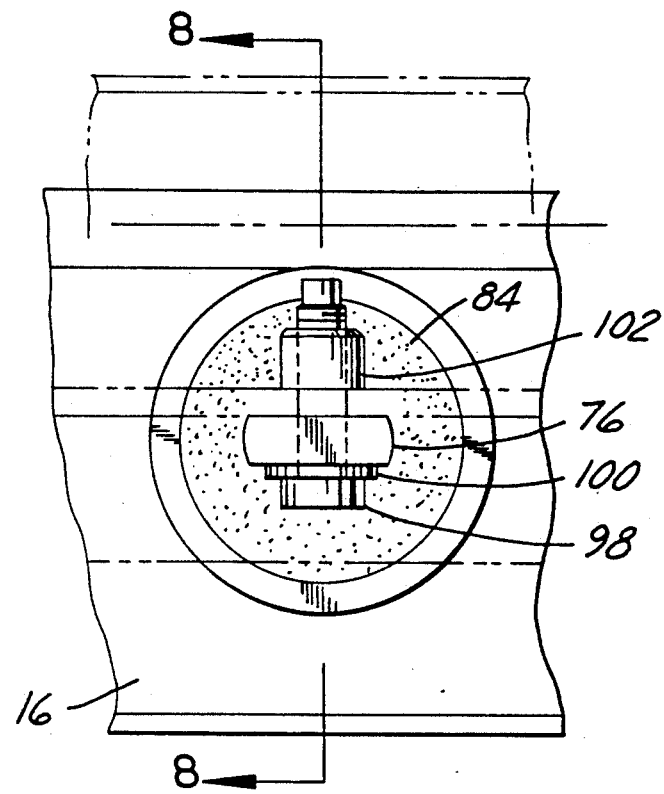
FIG. 7 is an enlarged and detailed side view of a portion of the FIG. 3 structure.

Referring now to the drawings in greater detail, FIG. 1 illustrates a vehicle body mount 10 including generally a frame 12 and a transverse, generally planar underbody floor pan 14. The frame 12 includes left and right longitudinal frame rails 16 with a bend 18 formed in the rear portion thereof. Front, center and back cross members 20 extend across the frame rails 16, the front one at the front end of the rails 16, and the rear one intermediate the bend 18 and the rear end of the rails 16. Each rail is an inverted U-shaped channel configuration defined by a top wall and a pair of side walls. Outwardly extending flanges 21 (FIGS. 8 and 13) are formed on the bottom edges of each rail 16. If desired, in lieu of an inverted U-shaped channel configuration, a bottom wall (not shown) may be secured to the bottom edges of the side walls of the flanges 21, forming rectangular shaped, hollow rails 16 and members 20.

A forward extension 22 is formed on the frame 12. The extension 22 includes spaced apart upwardly bending arms 24 having a bumper support plate 26 extending across the forward ends thereof. A second bumper support plate 28 extends across the rear ends of the frame rails 16.

A rectangular opening 30 located at a predetermined intermediate location, and forward, center, and rear positioned circular flanged openings 34, 36 and 38 are formed in each frame rail 16.

Two mounting plates 40 are extended through the oppositely disposed rectangular openings 30. As shown in FIGS. 4 and 5, the openings 30 have a height substantially greater than the thickness of the mounting plates 40. Pairs of bushing assemblies 44, 46 and 48 are mounted in the respective oppositely disposed circular flanged openings 34, 36 and 38, as will be explained.

The generally planar underbody floor cross pan 14 is formed of any suitable material, such as a structural plastic or a composite, and includes a plurality of longitudinally extending mounds and valleys formed across the width thereof, with the two outer mounds 50 adapted to mount over the frame rails 16, as shown in FIGS. 4 and 5. At least one cross sill 52 is integrally molded to the floor pan 14 intermediate the front and center cross members 20 to cooperate with the mounting plates 40, as will be explained. Substantially Z shaped metal reinforcement plates 54 and 56 (FIGS. 4, 5 and 8) are also integrally molded on the outside and inside of the outermost mounting portions 50 of the floor cross pan 14 in the vicinity of the mounting plate 40 and each bushing assembly 44, 46 and 48.

As further shown in FIGS. 4 and 5, the oppositely disposed end portions of the cross sill 52 have openings 58 formed therein to match openings 60 formed through the inner ends of each of the mounting plates 40. Openings 64 are formed through the pan 14 and the plates 54 and 56 to match openings 66 formed through the outer ends of each of the mounting plates 40 for connection therewith by suitable fasteners 67, including washers 67a and nuts 67b. Additional mounds 68, in the shape of an inverted U, are formed in the floor cross pan 14 adjacent the mounting portions 50, adapted to mounting over the fasteners 67. A cross member 69 may be mounted between the mounds 50 and 68.

Figure 8:
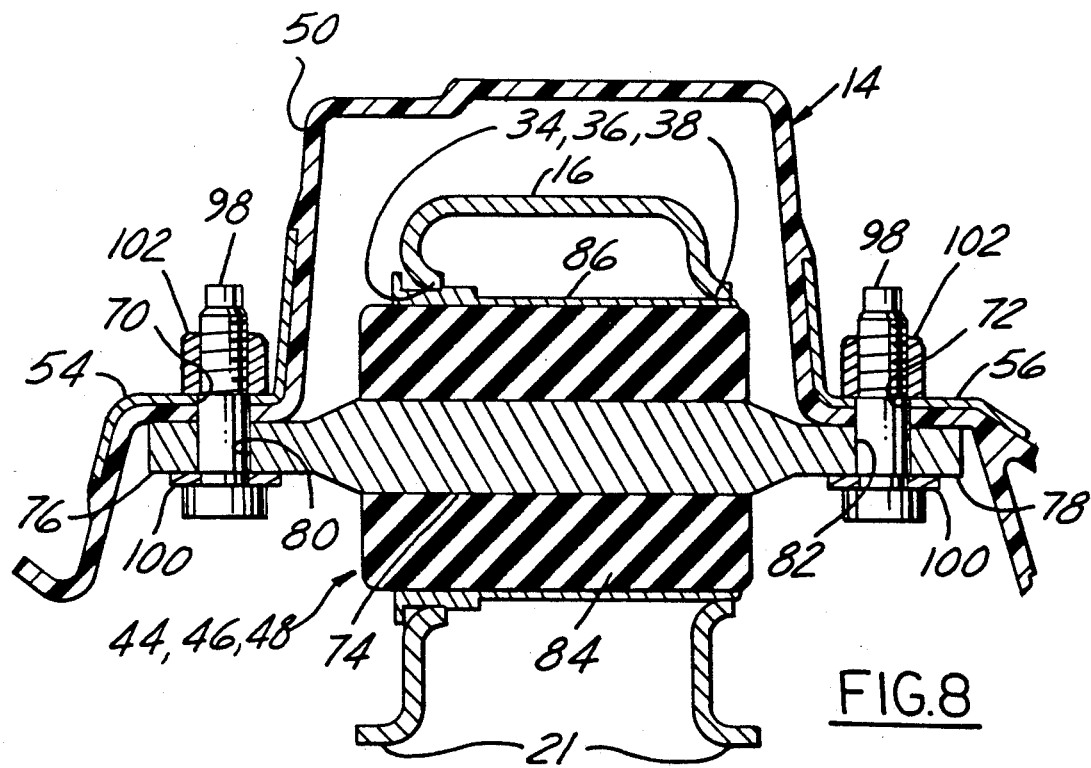
FIG. 8 is a cross sectional view taken along the plane of the line 8—8 of FIG. 7, and looking in the direction of the arrows.

As shown in FIG. 8, openings 70 and 72 are formed through the metal reinforcement plates 54 and 56 and through the adjacent surface of the pan 14 for cooperation with the bushing assemblies 44, 46 and 48, as will now be explained.

Each bushing assembly 44, 46 and 48 (FIG. 8) includes a substantially square cross section, horizontally oriented bar 74 having flattened ends 76 and 78 with respective openings 80 and 82 formed therethrough; an elastomeric bushing 84 molded around the bar 74 and into a metal cylindrical tube 86. Each casing 86 is pressed into the respective openings.

Figure 9:
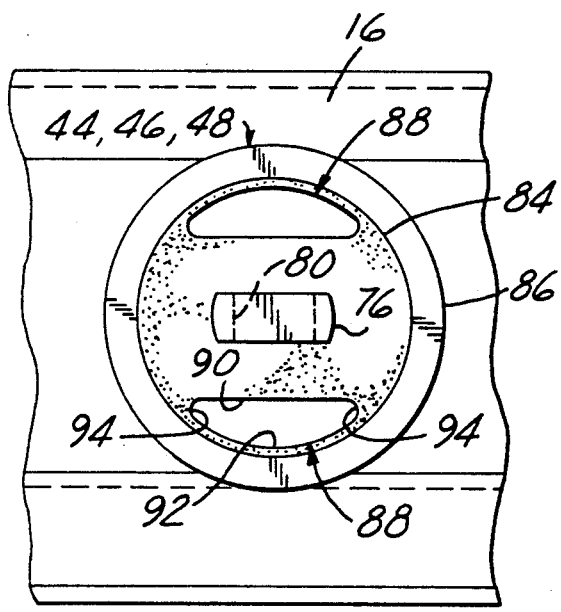
FIGS. 9-11 are end views of alternate embodiments of a portion of the invention.
Figure 10:
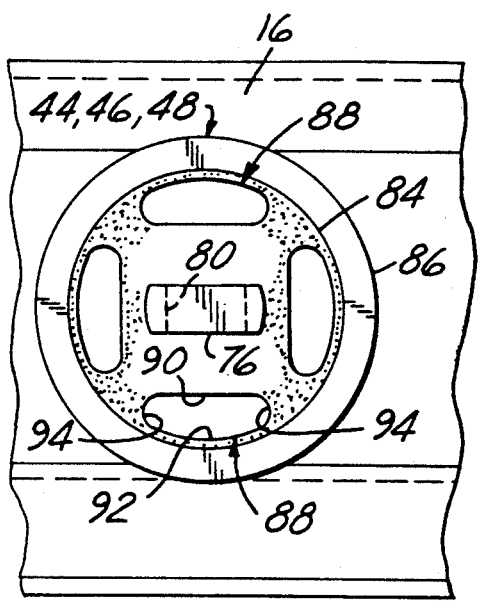
Figure 11:
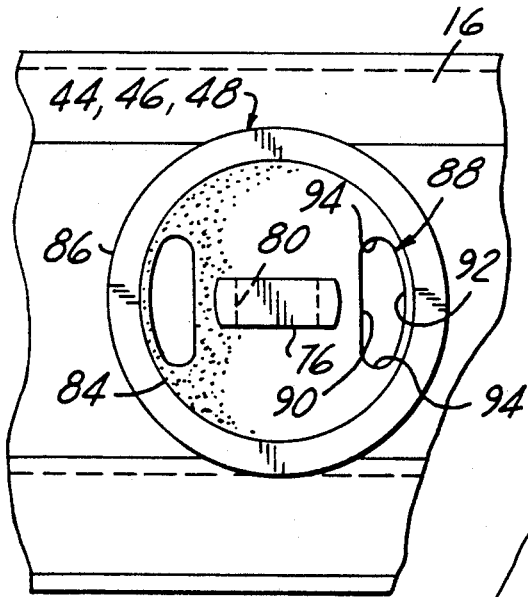

As shown in FIGS. 9-11, various longitudinal openings 88 are formed through each elastomeric bushing 84. The elastomeric material may be varied in durometer, damping properties, and size and variably voided by the openings 88, as required for proper tuning of the vertical and longitudinal rates of the mount, as well as the lateral rate of the mount, at the various positions of the assemblies 44, 46 and 48 along the frame rails 16.

More specifically, each longitudinal opening 88 is shaped to include a flat inner edge 90, and an arcuate-shaped outer edge 92 concentric with the surrounding tube 86 and spaced a predetermined distance therefrom, with the ends of the edges 90 and 92 connected by short arcs 94 of a predetermined radius.

Depending upon the location of the assemblies 44, 46 and 48, a particular assembly may include two oppositely disposed openings 88 positioned at 12 and 6 o'clock with respect to the bar 76 (FIG. 9), or at 3 and 9 o'clock with respect thereto (FIG. 11), or at any one or more of various positions around the bar 74 (FIG. 10).

Referring again to FIGS. 1 and 8, the oppositely disposed converted U-shaped mounting portions 50 of the floor pan 14 are seated on the flattened ends 76 and 78 in the locations of the reinforcement plates 54 and 56. Suitable fasteners, such as bolts 98, similar to the fasteners 67 of FIG. 5, having washers 100 therearound, are extended upwardly through the openings 80 and 82 in the ends 76 and 78 and, thence, through the openings 70 and 72 in the plates 54 and 56 and the adjacent sill, with nuts 102 threadedly mounted against the reinforcement plates 54 and 56.

Figure 12:
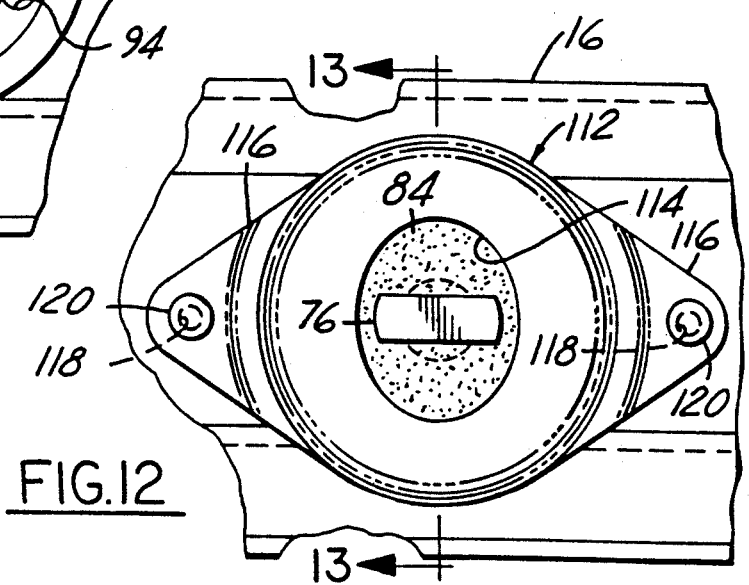
FIG. 12 is an end view of a further alternate embodiment of a portion of the invention.
Figure 13:
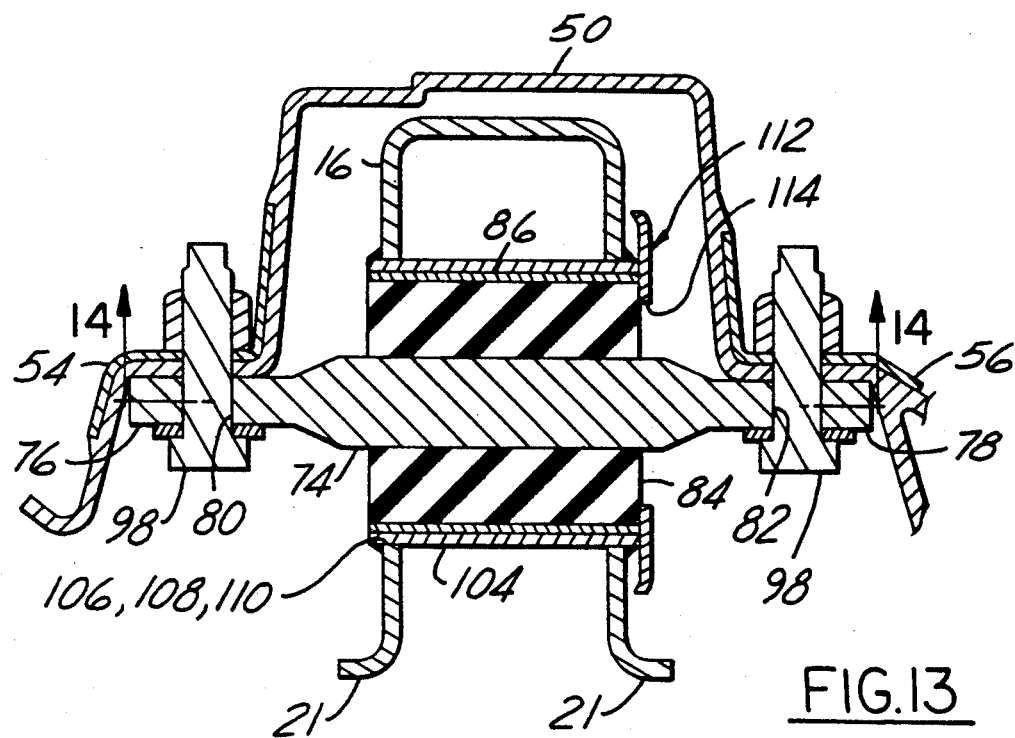
FIG. 13 is a cross sectional view taken along the plane of the line 13—13 of FIG. 12, as if the structure of FIG. 12 were mounted in the assembly.
Figure 14:
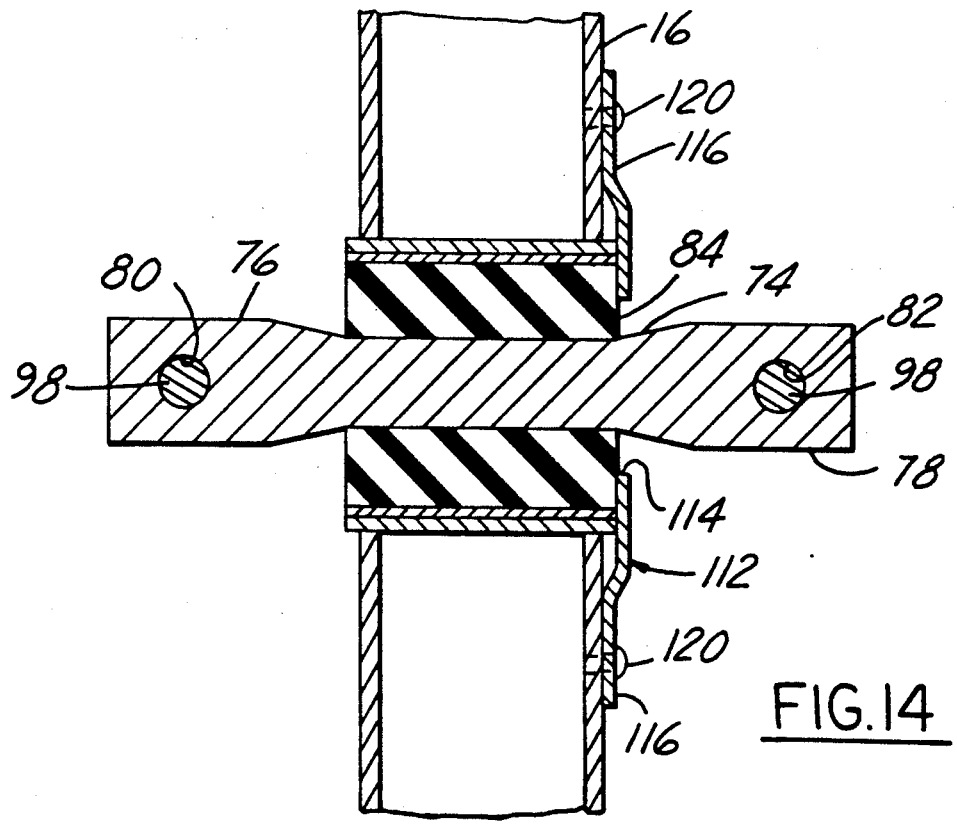
FIG. 14 is a cross sectional plan view of a portion of the FIG. 13 structure, taken along the plane of the line 14—14, and looking in the direction of the arrows.

Referring now to FIGS. 12-14, there is illustrated an alternate embodiment to the FIG. 8 arrangement. Elements common to the two embodiments will bear the same reference numerals.

As may be noted in FIGS. 12-14, the bushing assembly consisting of the bar 74, elastomeric bushing 84, and the casing 86 is slid into a sleeve member 104 which is welded in place (FIG. 13) in each of openings 106, 108 and 110, comparable to the openings 34, 36 and 38 of FIG. 8. An end cap 112, having a central opening 114 formed therein, is mounted around the bar 74 and abutted against the ends of the members 84, 86 and 104. Oppositely disposed flanges 116 (FIGS. 12 and 14) are formed on the cap 112, including openings 118 for the mounting therein of suitable fasteners 120 (FIG. 14), to secure the end cap to the frame rail 16. This retains the bushing assembly in place and provides support and axial compression force for the elastomeric bushing 84.

INDUSTRIAL APPLICABILITY

It should be apparent that the invention provides efficient and improved means for tuning the vertical, longitudinal and lateral rates of the mounting of an underbody floor on the oppositely disposed side rails of the frame for body-on-frame isolation.

It should be further apparent that the invention provides that the floor cross sill is mounted on bushing assemblies mounted in the frame structure such that the cross sill overlaps the frame structure, providing a low silhouette, and moves relative thereto.

While but one general and three sub-assembly embodiments of the invention have been shown and described, other modifications thereof are possible within the scope of the following claims.

What is claimed is:

1. A frame and underbody floor pan mounting arrangement for a motor vehicle, comprising a frame having oppositely disposed side rails, a plurality of longitudinally spaced bushing assemblies mounted through openings in each of said side rails, and an underbody floor pan having means formed thereon adapted to being mounted over said side rails and secured to opposite ends of each of said plurality of bushing assemblies, providing a low pan height and an isolated mounting of the vehicle body to the frame, and aligned openings formed through said side rails, a mounting plate extended through each aligned opening, and a cross sill secured to said underbody floor pan such that it is secured to inner ends of said mounting plates while said means is further secured to outer ends of said mounting plates such that said mounting plates are free to move within said aligned openings in response to movement of said floor pan on said plurality of bushing assemblies.

2. The frame and underbody floor cross pan mounting arrangement described in claim 1, wherein said underbody floor cross pan is formed of plastic, and said cross sill is formed of steel.

3. The frame and underbody floor cross pan mounting arrangement described in claim 1, wherein each of said bushing assemblies includes a center bar having elastomeric material molded therearound, encased by a cylindrical tube, a plurality of longitudinal openings formed through said elastomeric material, and said center bar having flattened perforated ends extending from each end of said elastomeric material secured to said means.

4. The frame and underbody floor pan mounting arrangement for a motor vehicle, comprising first and second frame side rails extending longitudinally of the vehicle body, each said first and second frame side rail having one of an inverted U-shaped channel configuration and a rectangular hollow configuration;

an underbody floor pan of a passenger compartment having an undersurface thereof overlapping said frame side rails, said floor pan formed with first and second transversely spaced longitudinally extending side portions formed as a generally inverted U-shaped configuration adapted to mount over said first and second frame side rails;

each said side frame rail having a plurality of longitudinally spaced circular aligned outboard and inboard openings formed therethrough, whereby each said first frame side rail aligned inboard and outboard openings are arranged in paired opposed relationship with each said second frame side rail aligned inboard and outboard openings, such that opposed openings have their centers aligned on a common transverse axis;

a bushing assembly positioned in each of said outboard and inboard aligned openings, each said bushing assembly including an outer cylindrical tube and an inner bar interconnected in a spaced manner by an elastomeric body, each said bushing inner bar aligned on a transverse axis of its associated aligned openings with its outer cylindrical tube received therein;

each said inner bar having free ends extending transversely a predetermined distance past its associated side rail so as to be in flush engagement with said floor pan undersurface, and fastener means fixing each said inner bar free ends to said undersurface, whereby said frame side rails support said underbody floor pan thereon in a compact isolated and overlapped manner while providing a low floor cross sill height.

5. The frame and underbody floor pan mounting arrangement described in claim 4, and aligned rectangular openings formed through said frame side rails, a mounting plate extended through each rectangular opening, and a cross sill secured to said underbody floor cross pan such that it is secured to inner ends of said mounting plates while said longitudinally extending side portions are secured to outer ends of said mounting plates such that said mounting plates are free to move within said aligned rectangular openings in response to movement of said floor pan on said plurality of bushing assemblies.

6. The frame and underbody floor plan mounting arrangement described in claim 1, wherein said means are oppositely disposed mounds formed on said underbody floor pan.

* * * * *